United States Patent
Agarwal et al.

(10) Patent No.: US 12,487,986 B2
(45) Date of Patent: Dec. 2, 2025

(54) GENERATING INFORMATION INTEGRITY INSTRUCTIONS USING A GENERATIVE MODEL

(71) Applicant: Maplebear Inc., San Francisco, CA (US)

(72) Inventors: Anant Agarwal, Sunnyvale, CA (US); Sebastián Soto, Emeryville, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/490,216

(22) Filed: Oct. 19, 2023

(65) Prior Publication Data
US 2025/0130986 A1    Apr. 24, 2025

(51) Int. Cl.
*G06F 16/23*    (2019.01)
(52) U.S. Cl.
CPC ................ *G06F 16/2365* (2019.01)
(58) Field of Classification Search
CPC ............ G06F 16/2365; G06F 2201/82; G06F 16/2358; G06F 11/1469; G06F 2201/80
USPC ........................................................ 707/694
See application file for complete search history.

(56) References Cited

U.S. PATENT DOCUMENTS

| | | | |
|---|---|---|---|
| 2004/0123101 A1* | 6/2004 | Rineer | G06F 21/645 713/161 |
| 2009/0150447 A1* | 6/2009 | Anderson | G06F 16/217 |
| 2017/0132525 A1* | 5/2017 | Rozier | G06Q 10/10 |
| 2018/0267887 A1* | 9/2018 | Dsouza | G06F 40/30 |
| 2019/0079753 A1* | 3/2019 | Makkar | G06F 8/36 |
| 2020/0081791 A1* | 3/2020 | Lv | G06F 9/45558 |
| 2020/0341888 A1* | 10/2020 | Sridhar | G06F 11/3692 |
| 2021/0149639 A1* | 5/2021 | Guisado | G06F 16/345 |
| 2025/0045256 A1* | 2/2025 | Gottlob | G06F 16/215 |

FOREIGN PATENT DOCUMENTS

CN    117009231 B  *  3/2024

* cited by examiner

*Primary Examiner* — Evan Aspinwall
(74) *Attorney, Agent, or Firm* — Fenwick & West LLP

(57) ABSTRACT

An online system stores data obtained from various users of the online system. For example, the online system maintains databases for various users, with a database including data received from the user. As users provide data to the online system for storage, the online system applies data integrity checks received from users that verifies received data satisfies one or more criteria. To facilitate creation and execution of data integrity checks, the online system tunes a large language model (LLM) using executable instructions for previously generated data integrity checks and metadata describing execution of the previously generated data integrity checks. After tuning, the online system obtains one or more parameters that are input as prompts to the LLM to generate executable instructions for performing a data integrity check using the parameters.

17 Claims, 4 Drawing Sheets

GENERATING INFORMATION INTEGRITY INSTRUCTIONS USING A GENERATIVE MODEL

BACKGROUND

Online systems maintain data for different users in different formats or may maintain different types of data for different users. As data maintained by an online system for various users may frequently change, the online system performs various checks for data management. For example, data validation checks are primarily concerned with ensuring that data conforms to specific rules or criteria, and these checks are used to verify that data entries are accurate, complete, and consistent with predefined standards or requirements. The criteria may be specified by a user from whom the data was received or by the online system. Additionally, data quality checks are used to assess and improve the overall quality of data, which may encompass various dimensions, including accuracy, completeness, consistency, reliability, and timeliness. Finally, the online system may also generate dashboard files that define dashboard user interfaces for viewing the data, which further helps in data management. Collectively, code for defining data validation checks or data quality checks (collectively, "data integrity checks") and code for defining dashboards is referred to herein as "data integrity instructions."

Conventionally, a user manually creates data integrity instructions that are used to check the integrity of the data that the online system subsequently executes. For example, conventional online systems receive structured data from the user in the form of executable instructions that the online system subsequently executes to determine whether data is valid. However, an online system may store different data in different formats, with different formats using different formats for retrieving data or otherwise identifying data. Additionally, to account for different formats in which data may be stored, when creating a data integrity check, users manually identify with one or more instructions which portions of the data are to be validated and manually specify in the one or more instructions one or more criteria against which the identified portions of the data are evaluated. This manual entry of instructions for each data integrity check results in significant time for creating one or more data integrity checks and significant amounts of user interaction with an online system to create different data integrity checks.

SUMMARY

In accordance with one or more aspects of the disclosure, an online system, such as an online concierge system, includes a data management system that maintains data from various sources. For example, different users provide the online system with data that the online system subsequently leverages to provide information to other users or to perform one or more processes. For example, a user is a retailer providing information describing products offered by retailers to the online system, and the online system leverages this information to recommend items to other users or to identify items offered by the retailer to other users.

The online system may store data using different structures or different formats. For example, the online system stores certain data, such as data from one or more specific types of users, in databases having a first format, and stores other data, such as data from one or more alternative types of users, in databases having a second format. Alternatively, the online system stores data received at different times in databases having different formats. While such flexibility in data storage format increases an amount of data capable of being stored and increases a variety of formats of data capable of being stored, maintaining data in various formats increases complexity of executing data integrity checks.

Because the online system uses stored data from a user to provide information to other users or to perform various processes, ensuring stored data satisfies one or more criteria prevents the online system from providing incorrect or incomplete information to users. Comparing stored data, or characteristics of stored data, to one or more criteria allows the online system to validate the stored data, with validated data suitable to be used by the online system. To reduce a likelihood of providing incorrect or incomplete information from stored data, the online system performs one or more data integrity checks. A data integrity check compares data identified by the data integrity check to one or more criteria. In response to the data satisfying at least a threshold amount of the one or more criteria, the online system determines the data is valid or otherwise suitable for use in one or more processes executed by the online system. However, in response to determining data does not satisfy at least a threshold amount of the one or more criteria, the online system determines the data is invalid or otherwise fails the data integrity check. When data is determined to be invalid, the online concierge system may notify a user from whom the data and may request the user update the data while preventing the invalid data from being included in one or more processes executed by the online system.

As the online system maintains data in various formats, different data integrity checks are applied to different data. For example, identifying data retrieved from a database with a first format uses instructions with different syntax or formatting than instructions for identifying data retrieved from another database with a second, different, format. The differing formats in which data may be stored may prevent a data integrity check from being reused for different data without review and modification to account for variations in storage format. Further, data integrity of different types of data is evaluated in different ways, so data integrity checks are conventionally manually configured by users to account for characteristics of and storage of particular data to which a data integrity check is applied. For example, certain data is valid if an aggregate value of the data satisfies a criterion, while other data is valid if each value in a specific field of the data is within a specified set of values.

To simplify generation of data integrity instructions, in one or more embodiments, the online system retrieves previously generated data integrity instructions stored by the online system for previously executed data integrity instructions. As used herein "data integrity instructions" refers to code for defining data validation checks or data quality checks (collectively, "data integrity checks") and code for defining dashboard interfaces in which results of a data integrity check or information from executing a data integrity check. For example, the online system may maintain a repository of files, with each file including instructions that, when executed by a processor, perform a data integrity check. Each set of previously used data integrity instructions stored in the repository includes information identifying data to be evaluated and one or more criteria against which the identified data is to be evaluated. Previously used data integrity instructions may include other information, such as instructions for retrieving particular data from a source (e.g., specific fields from a database), a format in which the data is stored, a time when the particular instructions are to be run, one or more metrics determined for the data that are compared to the one or more criteria, or other information describing data retrieval or determining data integrity of the retrieved data. In various embodiments, the previously used instructions are retrieved from a single source, such as the online system, to account for configuration or implementation details specific to the online system.

When retrieving the previously used data integrity instructions, the online system also retrieves information describing modification of previously used data integrity instructions. For example, a file including previously used data integrity instructions may be associated with a log file identifying modifications to the previously used data integrity instructions in the file over time. Retrieving the log file along with the previously used data integrity instructions allows the online system to account for changes to data integrity instructions over time. As another example, the online system retrieves a pull request associated with a file including previously used data integrity instructions, where the pull request identifies modifications from a version of the previously used data integrity instructions included in the file relative to a prior version of the previously used data integrity instructions. Further, one or more files including comments describing modification or execution of previously used data integrity instructions in a file may be retrieved along with the file. For example, such comments may be included in the file with the previously generated data integrity instructions, in some embodiments.

Additionally, the online system retrieves metadata describing previously used data integrity instructions. For example, retrieved metadata associated with previously used data integrity instructions identifies times when the previously used data integrity instructions were executed to perform a corresponding data integrity check. The online system may leverage stored information identifying times when the previously used data integrity instructions were executed to determine a frequency with which the corresponding data integrity check was executed. Additionally, the retrieved metadata may describe a result of a check corresponding to execution of the previously used data integrity instructions. Further, metadata may identify a format or a structure of data, such as a format or structure of a database, on which the check corresponding to the previously used data integrity instructions was performed. As another example, metadata for previously used data integrity instructions includes one or more parameters specified by a user for generation of the previously used data integrity instructions, providing additional information about configuration of the previously used data integrity instructions. For example, metadata for previously used data integrity instructions include one or more prompts received from a user that caused generation of the previously generated data integrity instructions. As another example, metadata for previously used data integrity instructions comprises textual information describing a purpose of the previously used data integrity instructions, which may identify data on which a data validity check is performed, a goal of performing the data integrity check, or other information describing a purpose of the data integrity check. Different metadata for different previously used data integrity instructions may be retrieved, in various embodiments.

When the previously used data integrity instructions include instructions for generating a dashboard interface, execution of the data integrity instructions displays information describing execution of a data integrity check in a dashboard interface. For example, the data integrity instructions identify one or more metrics determined by a data integrity check corresponding to the previously used data integrity instructions that are displayed to a user. As another example, the data integrity instructions include instructions for displaying or presenting an indication whether data is valid or is invalid in response to execution of a data integrity check corresponding to the previously used data integrity instructions. Instructions for generating the dashboard interface may also identify how a result of a data integrity check corresponding to previously used data integrity instructions is communicated to a user (e.g., via an email, via a web page, a textual display, a graphical display, etc.).

The online system leverages the previously used data integrity instructions and the metadata describing the previously used data integrity instructions to tune a generative model. In various embodiments, the generative model is a large language model (LLM) initially comprising a set of weights determined from training the large language model on a text corpus. The online system generates multiple supplemental examples for tuning the generative model based on the previously used data integrity instructions and the metadata describing the previously used data integrity instructions. The supplemental examples from the previously used data integrity instructions and the metadata describing the previously used data integrity instructions are provided as an input to the generative model, along with additional information, so the generative model outputs data integrity instructions. For example, a request received by the online system includes one or more parameters for new data integrity instructions, and the online system generates a prompt for input to the generative model that includes the parameters and a supplemental example selected based on the parameters. The data integrity instructions generated by the generative model perform a data integrity check or generate a dashboard user interface based on the received parameters. Hence, each supplemental example identifies data integrity instructions expected to be generated in response to one or more received parameters.

When the online system receives a request to generate new data integrity instructions, which may include metadata describing the new data integrity instructions, the online system tunes the generative model by selecting previously used data integrity instructions and corresponding metadata based on similarity of the subset of the stored data integrity instructions to the requested new data integrity instructions. The selected previously used data integrity instructions and corresponding metadata augment information describing the new data integrity instructions. To select previously used data integrity instructions and corresponding metadata, in various embodiments, one or more embeddings are generated for each supplemental example and stored in a GPT index. The online system generates an embedding for the information describing the new data integrity instructions that is compared to embeddings for each supplemental example. Based on measures of similarity between embedding for the information describing the new data integrity instructions and embeddings for supplemental examples, the online system identifies a supplemental example that is similar to the received prompt. For example, the online system selects a supplemental example having an embedding with a maximum measure of similarity (e.g., cosine similarity, dot product) to the embedding for the information describing the new data integrity instructions. The online system generates a prompt for the generative model by augmenting the received information describing the new data integrity instructions with the previously used data integrity instructions and corresponding metadata from the selected supplemental example. In some embodiments, the prompt includes the information describing the new data integrity instructions and the embedding of the selected supplemental example. Hence, the generative model is applied to the received information describing the new data integrity instructions combined with the selected supplemental example, so the identified supplemental example provides the generative model with additional context for generating the new data integrity instructions.

In one or more embodiments, the online system presents to a user a user interface through which information describing the new data integrity instructions is received. For example, the online system presents the user interface in response to receiving a request from the user to configure an internal service for the user or to generate new data integrity instructions. As an example, in response to the online system receiving a request to generate a database for the user, the online system generates a user interface requesting information describing the database to be generated that is displayed or otherwise presented to the user. Information describing the new data integrity instructions may be one or more parameters for a data integrity check, a textual description of the data integrity check, such as a textual description of a purpose or a goal of the new data integrity instructions. The user interface may receive unstructured text data from the user describing the new data integrity instructions, in some embodiments.

As further described above, the online system generates a prompt for the generative model including the identified previously used data integrity instructions and the metadata about the identified previously used data integrity instructions. In various embodiments, the prompt includes received information describing the new data integrity instructions and the identified previously used data integrity instructions and the metadata about the identified previously used data integrity instructions. In response to receiving the generated prompt, the generative model generates the new data integrity instructions.

The online system outputs the new data integrity instructions generated by the generative model. For example, the online system publishes the new data integrity instructions to a data repository including the previously used data integrity instructions. As another example, the online system displays the new data integrity instructions to the user requesting the new data integrity instructions via a user interface. The user may modify one or more portions of the new data integrity instructions via the user interface prior to the online system storing the new data integrity instructions. In such embodiments, the online system stores the modified new data integrity instructions, allowing the user to modify the new data integrity instructions so the online system stores the modified new data integrity instructions. Further, in some embodiments, the online system stores a pull request in the data repository that identifies changes to one or more previously used data integrity instructions to the data repository, with subsequent execution of the pull request generating the new data integrity instructions for execution by modifying stored previously used data integrity instructions. Generating the prompt for the generative model leverages previously used data integrity instructions, the generative model prevents a user from manually identifying syntax and configuration data integrity instructions, reducing an amount of time for creation and execution of data integrity instructions.

DETAILED DESCRIPTION

Figure 1:
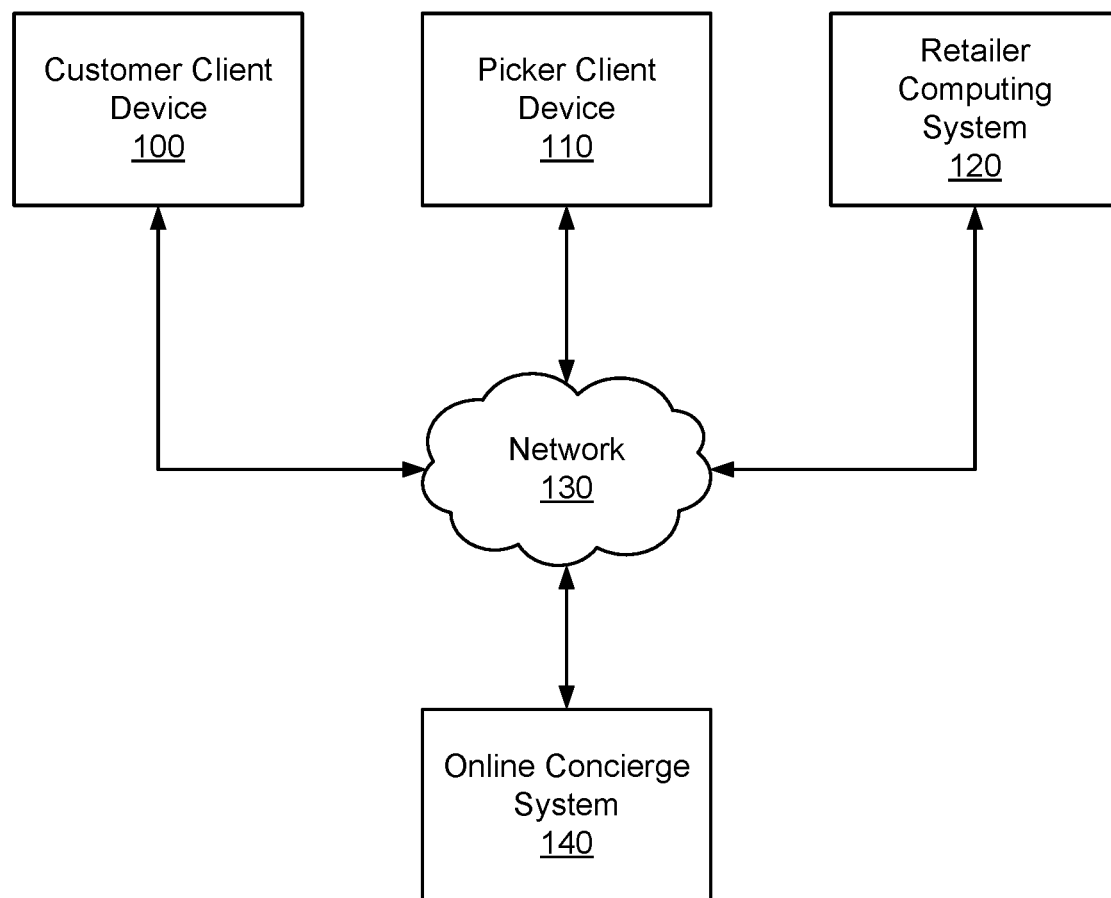
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
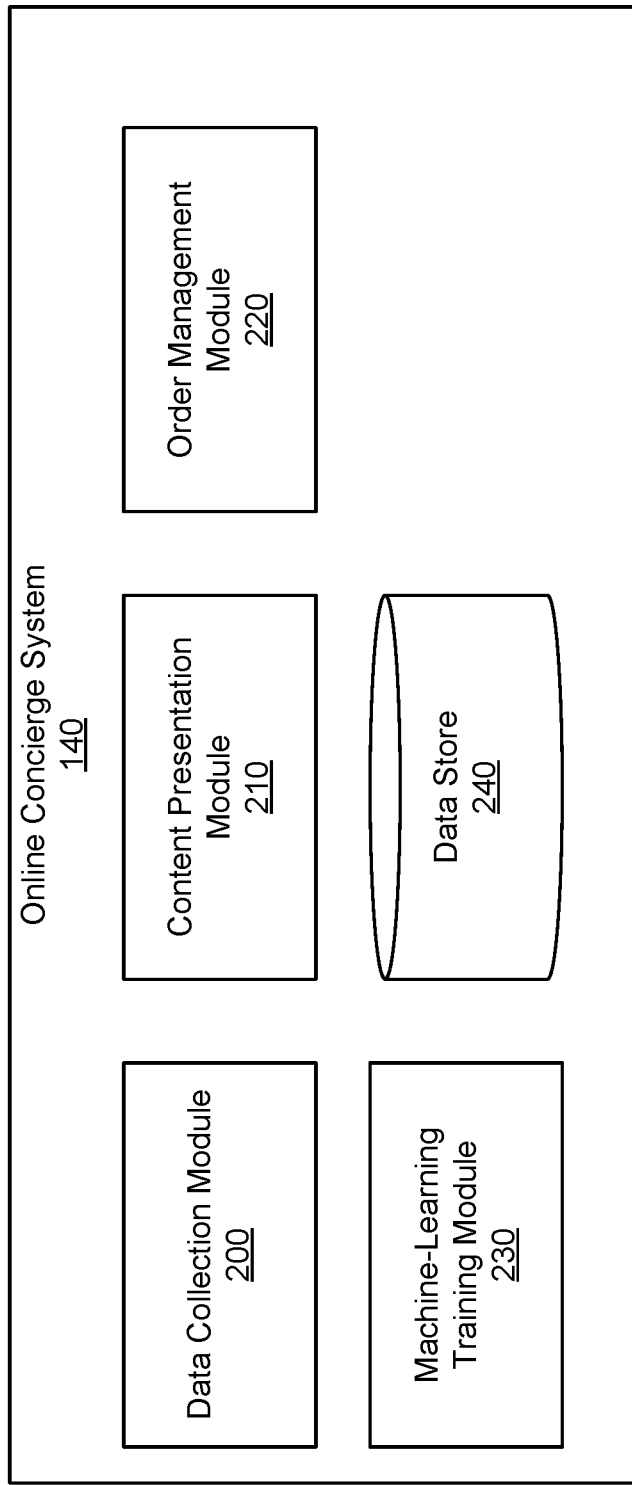
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

In some embodiments, the content presentation model 210 generates and presents a user interface requesting information describing new data integrity instructions for execution by the online concierge system 140. As used herein "data integrity instructions" refers to code for defining data validation checks or data quality checks (collectively, "data integrity checks") and code for defining dashboard interfaces in which results of a data quality check or information from executing a data integrity check. A data integrity check identifies data, such as data stored in the data store 240, and specifies one or more criteria for the identified data to determine whether the identified data is valid or is invalid. For example, data is valid in response to the data satisfying at least a threshold amount of criteria included in a data integrity check. In contrast, data is determined to be invalid if the data does not satisfy at least the threshold amount of criteria included in the data integrity check. As further described below in conjunction with FIGS. 3 and 4, the content presentation model 210 receives a request from a user for new data integrity instructions and displays a user interface to the user for receiving information describing the new data integrity instructions. The user interface receives metadata describing the new data integrity instructions in various embodiments, which may be a textual description of a purpose or a goal of a data integrity check included in the data integrity instructions.

In some embodiments, the user interface receives information describing the new data integrity instructions, including metadata describing the new data integrity instructions. Alternatively, the user interface is a form where different fields receive different information describing new data quality instructions. For example, each field in the user interface corresponds to a different type of information describing new data quality instructions. In embodiments where the user interface comprises a form, fields included in the user interface may be determined from one or more stored templates, with different templates corresponding to different types of data integrity instructions. For example, the content presentation module 210 receives information identifying a type of data integrity check from the user, retrieves a template corresponding to the identified type of data integrity check, and generates the user interface based on the retrieved template.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 tunes one or more generative models that receive unstructured text as input and generates one or more outputs based on the unstructured text. A generative model is a large language model in various embodiments. For example, a generative model may be generative pre-trained transformer models (GPTs) in various embodiments. For example, a generative model is a large language model previously trained on a text corpus to output text in response to a text prompt from a user. To tune a generative model, the machine learning training model 230 generates supplemental examples including stored data integrity instructions, such as data integrity instructions that were previously used by the online concierge system 140, and corresponding metadata describing the stored data integrity instructions. For example, the machine learning training model 230 generates a GPT index including embeddings corresponding to each supplemental example to facilitate identification and retrieval of one or more supplemental examples. The machine learning training model 230 stores the GPT index including the supplemental examples, or the embeddings for the supplemental examples.

Subsequently, the content presentation model 210 leverages the GPT index to generate a prompt for the generative model by identifying a supplemental example, which includes a subset of the stored data integrity instructions and corresponding metadata, and including the supplemental example in a prompt for the generative model. For example, the content presentation model 210 compares an embedding for information describing new data integrity instructions, which may include metadata describing the new data integrity instructions, to embeddings in the GPT index for different supplemental examples. Information from a supplemental example with an embedding having a maximum measure of similarity (e.g., dot product, cosine similarity) to the embedding for the information describing the new data integrity instructions is used to generate a prompt for input to the generative model is used to generate a prompt for the generative model. For example, the prompt includes information from the supplemental example with the maximum measure of similarity to the embedding for the information describing the new data integrity instructions along with information describing the new data integrity instructions. The prompt may include an embedding for a supplemental example, or other information from the supplemental example, along with information describing the new data integrity instructions. This allows the prompt to provide the generative model, which is a large language model trained on a text corpus, with additional contextual information about data integrity instructions by including information from a supplemental example, as further described below in conjunction with FIGS. 3 and 4. Hence, the supplemental examples allow the machine learning module 230 to tailor the generative model for generating instructions for execution by the online concierge system 140.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

In various embodiments, the data store 240 includes multiple databases, with different databases storing different data. Different databases may store data in different formats, with different instructions used to access or to retrieve data from different databases. For example, the data store 240 includes different item databases for different retailers, where an item database includes attributes of various items offered by a retailer. Users, such as a retailer, may modify data included in a database over time. As the online concierge system 140 leverages data included in the one or more databases to present information to customers or to pickers, the online concierge system 140 performs various checks on data included in a database to determine whether the stored data in the database is valid. Data that is determined to be valid is suitable for use by the online concierge system 140 to perform one or more actions. In response to determining data in a database is not valid (i.e., the data is "invalid"), the online concierge system 140 does not use the data when performing one or more actions and may transmit a notification to a user (e.g., a retailer) associated with the database identifying the invalid data. The notification may request the user correct the invalid data or provide data missing from the database to the online concierge system 140. Checking for data integrity of various data prevents the online concierge system 140 from providing a customer, a shopper, or another user with inaccurate or incomplete information.

Figure 3:
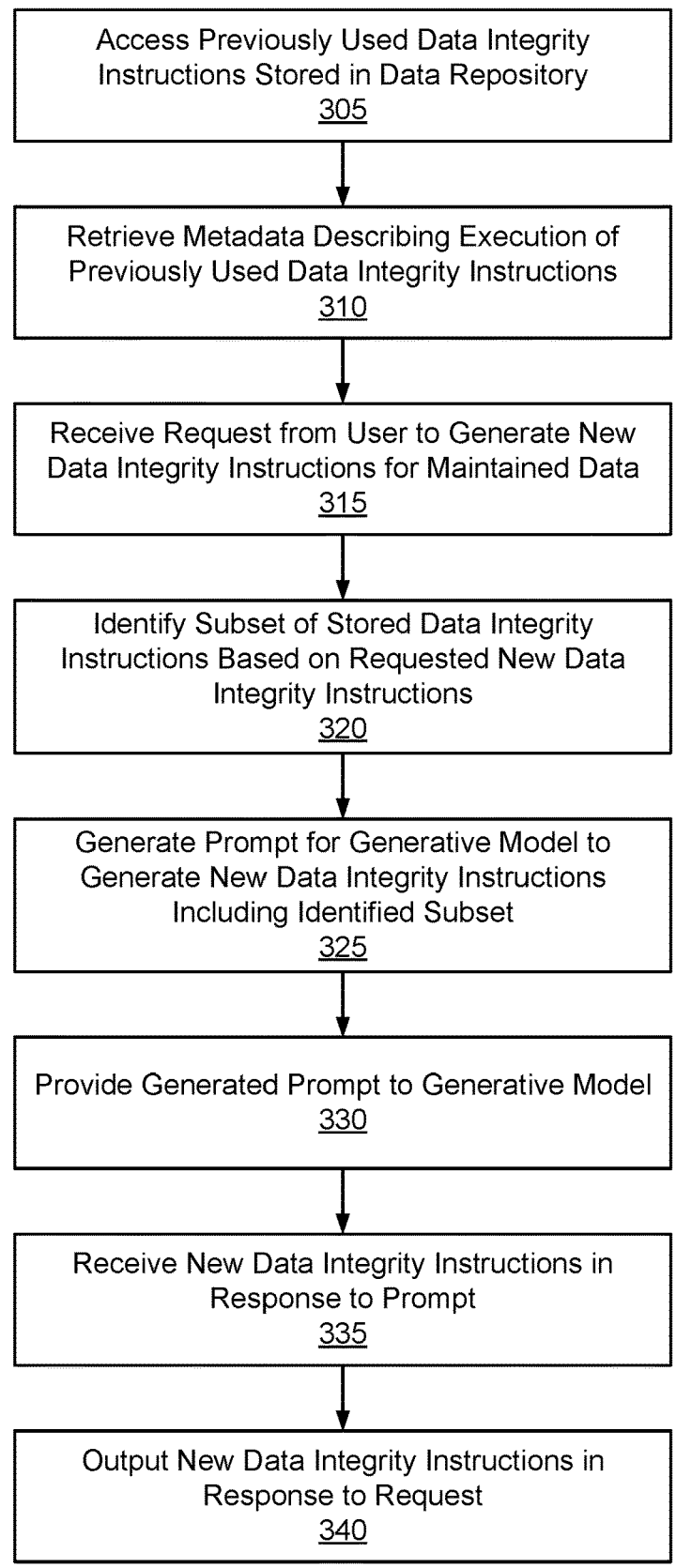
FIG. 3 is a flowchart of a method for generating data integrity instructions for an online system using a trained generative model, in accordance with one or more embodiments.

FIG. 3 is a flowchart of a method for generating data integrity instructions for validating data stored by an online system using a trained generative model, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140) or a data management system; however, in other embodiments, the steps may be performed by another type of online system. Additionally, each of these steps may be performed automatically by the online concierge system without human intervention.

An online system, such as an online concierge system 140 or a data management system, receives and stores data obtained from various users. Subsequently, the online system leverages the stored data from one or more users to provide various functionality to other users. For example, an online concierge system 140 receives data identifying items and attributes of items from various retailers and stores an item database for each retailer in a data store 240. The item database includes different fields that each correspond to a different attribute of an item. As another example, the online concierge system 140 maintains a customer database in the data store 240, with the customer database having different fields that each correspond to a different characteristic of a customer.

The online system leverages the stored data to provide different functionality to a customer, to a shopper, or to another user. For example, an online concierge system 140 retrieves data from an item database maintained for a retailer and presents a customer with information about items offered by the retailer. As another example, the online concierge system 140 leverages information about items in an item database to determine a probability of different items being available at the retailer. As another example, the online concierge system 140 leverages data of a customer from a customer database and data about items in an item database for a retailer to select one or more replacement items for the customer in response to an item in an order from the customer being unavailable at the retailer. In another example, the online concierge system 140 retrieves data from the customer database to determine a location where a picker delivers items in an order from the customer.

In various embodiments, the online system stores different data in different formats. For example, an item database has a first structure and a first format for data included in the item database, while a customer database has a second structure or a second format that differs from the first structure or the first format, respectively. As another example, different item databases have different structures or store different data in different formats. Further, data obtained by the online system at different times may be stored in different formats, as the online system may change data storage over time.

Users may frequently modify data maintained by the online system. For example, a retailer periodically modifies one or more attributes of one or more items in an item database. As an example, a retailer updates a quantity of an item available at the retailer at a periodic interval. In another example, the retailer transmits information identifying a new item and its corresponding attributes to the online system for inclusion in an item database as the retailer obtains new items. In another example, a customer updates a location stored in a customer database in association with the customer. Different data maintained by the online system may be updated with different frequencies.

As the online system leverages stored data from users to provide different functionality for other users, the online system performs one or more data integrity checks on stored data to determine whether the stored data is valid. The online system determines data is valid if the data satisfies at least a threshold amount of criteria specified by the data integrity check. In various embodiments, the online system specifies the criteria for determining data integrity, while in other embodiments a user specifies the criteria used by a data integrity check to determine validity of data. In various embodiments, the criteria for determining data validity identify a specific format or a specific value for data in a specific field of a database. For example, criteria for determining data validity include a format for values of a particular field the data, a specific metric determined from values in the particular field of the data, whether the field of the data includes a value, whether a value of data in the particular field has a value within a set of values, or other comparison of a portion of the data to corresponding criteria.

To perform a data quality check, the online concierge system 140 obtains instructions that, when executed by the online concierge system 140, retrieve data identified by the instructions and compare at least a portion of the retrieved data to one or more criteria identified by the instructions. For example, the instructions identify a database and one or more fields within the database, as well as one or more criteria to which values in the identified one or more fields are compared. In response to the values in the identified one or more fields satisfying at least a threshold amount of criteria, the online concierge system 140 determines the data is valid. In response to determining data is valid, the online concierge system 140 subsequently uses the data in one or more actions or enables presentation of the data to other users. In response to determining data is not valid (i.e., the data is invalid), the online concierge system 140 does not use the data in one or more subsequent actions, prevents other users from accessing the data, or performs one or more other actions. For example, the online system does not retrieve one or more attributes of items in response to a data integrity check determining when stored values of the attributes in an item database are invalid.

To account for differences in formats or structures in which different data is stored when validating stored data, data integrity checks performed by conventional online concierge systems 140 are manually created by users, with a user manually entering instructions for execution to perform a data integrity check. Manually entering instructions to execute for a data integrity check increases an amount of time for creating a data integrity check or for creating a dashboard interface displaying interface from executing a data integrity check, as a user entering the instructions determines appropriate syntax for the instructions to account for a particular format in which the data being checked for data integrity is stored, to ensure identification and retrieval of an appropriate portion of the data. Additionally, a user entering the instructions to execute for a data integrity check determines criteria against which data is evaluated for data integrity, and determines how to identify a result or other information about execution of the check for data integrity to other users. The amount of time for manual entry of instructions to be completed also increases an amount of time for the online system to perform various data integrity checks, as the manual entry and configuration of instructions for data integrity checks increases an amount of time for a data integrity check to be created. Further, changes in formats in which the online system stores data may lead to manual revision of previously created instructions for a data integrity check, further increasing an amount of time for the online concierge system 140 to apply the data integrity check to data.

To simplify generation of instructions for performing a data integrity check that are subsequently stored by the online system, the online system accesses 305 stored previously used data integrity instructions. As used herein, "data integrity instructions" include code for defining data validation checks or data quality checks (collectively, "data integrity checks") and code for defining dashboard interface displaying information from execution of a data integrity check. The online system stores previously used data integrity instructions in a data repository (e.g., in the data store 240) that includes different files including previously stored data integrity instructions, with different files corresponding to different data integrity instructions. The online system accesses 305 various files for different data integrity instructions from the data repository or other storage location.

When accessing 305 stored data integrity instructions, the online system also retrieves information describing configuration of the stored data integrity instructions by one or more users generating or modifying the data integrity instructions. For example, information describing configuration of stored data integrity instructions comprises comments within a file including the stored data integrity instructions, with the comments describing rationale or details for configuration of one or more parameters within the stored data integrity instructions. As another example, information describing configuration of the stored data integrity instructions comprises one or more pull requests that each identify modification of one or more stored data integrity instructions between different versions of the stored data integrity instructions. In another example, information describing configuration of the stored data integrity instructions comprises a log file or log history identifying modifications to the stored data integrity instructions. For example, a file including stored data integrity instructions has an associated log file describing or detailing modifications to the stored data integrity instructions that is accessed 305 in conjunction with the file including the stored data integrity instructions.

Additionally, the online concierge system 140 retrieves 310 metadata describing stored data integrity instructions. For example, retrieved metadata identifies times when stored data integrity instructions were executed to perform a corresponding data integrity check. The online concierge system 140 may leverage stored information identifying times when the stored data integrity instructions were executed to determine a frequency with which the data integrity check corresponding the stored data integrity instructions was performed. Similarly, stored information identifying times when the stored data integrity instructions were executed allows the online concierge system 140 to determine times when a data integrity check corresponding to the stored data integrity instructions is most likely to be executed. Additionally, the retrieved metadata may describe a result of a data integrity check corresponding to execution of the stored data integrity instructions. For example, a result of a data integrity check indicates whether data was determined to be valid or was determined to be invalid when the data integrity check was performed. Further, metadata retrieved 310 by the online system identifies a format or a structure of data, such as a format or structure of a database, on which the data integrity check corresponding to the stored data integrity instructions. The online concierge system 140 may retrieve 310 different metadata for different stored data integrity instructions in various embodiments.

In various embodiments, one or more stored data integrity instructions include instructions that, when executed by a processor, generate a dashboard interface displaying information describing execution of a data integrity check. For example, a dashboard interface displays a result of a data integrity check. The dashboard interface may visually present an indication whether data to which a data integrity check was applied is valid or is invalid and may also or alternatively display one or more metrics or other values generated from application of the data integrity check to the data. Different data integrity instructions may have different instructions for generating a dashboard interface, so results from different data integrity instructions may be displayed in different formats.

The online system receives 315 a request from a user to generate new data integrity instructions for data stored by the online system. In various embodiments, the request includes metadata describing the new data integrity instructions. Alternatively, the online system receives metadata describing the new data integrity instructions subsequent to receiving 315 the request. For example, the online system receives metadata describing the new data integrity instructions through one or more user interfaces. In various embodiments, the metadata is textual data describing a purpose or a reason for the new data integrity instructions. The metadata may be unstructured text.

Based on the received request, the online system identifies 320 a subset of stored data integrity instructions and corresponding metadata. In various embodiments, the subset of stored data integrity instructions and corresponding metadata is identified 320 based on a similarity of the subset of the stored data integrity instructions to the requested new data integrity instructions. As further described above in conjunction with FIG. 2, the online system generates an index, such as a GPT index from the stored data integrity instructions and corresponding metadata. In various embodiments, the index includes multiple supplemental examples, with each supplemental example including a subset of stored data integrity instructions and corresponding metadata. The index may include an intermediate representation of different subsets of stored data integrity instructions and corresponding metadata, such as an embedding for each subset of stored data integrity instructions and corresponding metadata. For example, the GPT index generates an embedding for each supplemental example that includes a subset of stored data integrity instructions and corresponding metadata. The embedding for a supplemental example represents the subset of stored data integrity instructions and corresponding metadata in the supplemental example in a high dimensional space. In other examples, the GPT index generates a tree index maintaining relationships between tokens of supplemental examples, with tokens in higher levels in a tree including more general information about tokens in lower levels of the tree or generates a list index where different tokens of supplemental examples are sequentially organized. Other forms of indices may be used to represent the supplemental examples.

In embodiments where the index includes embeddings for different supplemental examples, the online system identifies 320 the subset of stored data integrity instructions and corresponding metadata based on measures of similarity between embeddings for different supplemental examples and an embedding for metadata about the new data integrity instructions. For example, the online system determines a supplemental example with an embedding having a maximum measure of similarity (e.g., dot product, cosine similarity) to the embedding for the metadata about the new data integrity instructions. The online system identifies 320 the subset of stored data integrity instructions and corresponding metadata included in the determined supplemental example.

The online system leverages the identified subset of stored data integrity instructions and corresponding metadata to tune a generative model to generate the new data integrity instructions corresponding to the request. The generative model is a large language model trained to receive text as input and to output text. Tuning the generative model based on the subset of stored data integrity instructions and corresponding metadata causes the generative model to output data integrity instructions that, when executed by a processor, perform a data integrity check of data identified by the input to the generative model or generate a dashboard interface displaying information describing execution of a data integrity check.

From the identified subset of stored data integrity instructions and corresponding metadata along with the metadata describing the new data integrity instructions, the online system generates 325 a prompt that is input to the generative model. In various embodiments, the prompt includes both the metadata describing the new data integrity instructions and identified subset of stored data integrity instructions and corresponding metadata. Alternatively, the prompt includes the metadata describing the net data integrity instructions and an embedding for the identified subset of stored data integrity instructions and corresponding metadata. Including the identified subset of stored data integrity instructions and corresponding metadata when generating 325 the prompt tunes the generative model from the supplemental examples in the training dataset, which tailors the generative model to generate data integrity instructions based on stored data integrity instructions and corresponding metadata. The identified subset of stored data integrity instructions and corresponding metadata provides the generative model with an example of stored data integrity instructions similar to the metadata describing the new data integrity instructions.

The online system provides 330 the generated prompt, including the identified subset of stored data integrity instructions and corresponding metadata, to the generative model, and receives 335 the new data integrity instructions generated by the generative model. The new data integrity instructions may perform a data integrity check that, when executed by a processor. Alternatively or additionally, the data integrity instructions include instructions that, when executed by a processor, generate a dashboard interface displaying information describing the data quality check (e.g., results of the data integrity check, one or more metrics generated from execution of the data integrity check, etc.). In various embodiments, metadata about the new data integrity instructions includes one or more preferences or selections of how to present results of the data integrity check or other information about the data integrity check. This allows a user for whom the new data integrity instructions are generated to specify how results of the check are subsequently displayed. As the prompt includes stored data integrity instructions and corresponding metadata, the prompt allows the generative model to account for contextual information about prior data integrity instructions and corresponding instructions when generating new data integrity instructions based on the received request.

This allows the new data integrity instructions to account for information such as an expected frequency with which the data integrity check will be executed, a likelihood of the data integrity check indicating data is valid (or is invalid), or other information describing performance or execution of similar data integrity instructions. Leveraging contextual information from a similar subset of data integrity instructions included in the prompt allows the generative model to generate instructions optimized for the data integrity instructions corresponding to metadata included in or obtained via the received request also included in the prompt. This reduces an amount of time and user interaction with the online concierge system 140 to generate and to subsequently implement a data integrity check or to generate a dashboard interface. Further, leveraging stored data integrity instructions and corresponding metadata describing the stored data integrity instructions allows the generative model to account for different formats in which the online concierge system 140 stores data, as well as to specify parameters to optimize performance of a data integrity check. This expedites generation and execution of additional data integrity checks.

As the generative model leverages the identified subset of stored data integrity instructions and corresponding metadata included in the prompt, the generative model streamlines generation and implementation of data integrity instructions relative to manual configuration of data integrity instructions. Leveraging stored data integrity instructions and corresponding metadata in the prompt allows the generative model to more rapidly account for specific formats or structures in which data is stored when generating data integrity instructions. This reduces an amount of time for generating data integrity instructions by having the generative model automatically determine a format and a syntax for retrieving and for evaluating data compared to a user manually creating and formatting instructions for data integrity instructions. Hence, the generative model allows a user to provide metadata about new data integrity instructions from which the generative model automatically generates the new data integrity instructions, which increases a likelihood of the data integrity instructions conforming to a format in which data was stored, while and reducing a time for generating the data integrity instructions.

In various embodiments, the new data integrity instructions include instructions for displaying a dashboard interface. As further described above, a dashboard interface may display information describing a data integrity check. For example, the dashboard interface displays a result from the data integrity check that specifies data is valid or is invalid. Alternatively or additionally, the dashboard interface may display one or more specified metrics generated from the data when performing the data integrity check. The data integrity instructions may identify a format in which information describing performance of a data integrity check is displayed, such as visual formatting or visual presentation of information from the data integrity check, as well as a communication channel through which a user receives the information describing performance of the check for data integrity (e.g., the user receives an email with the information describing performance of data integrity check, a web page the user accesses to view the information describing performance of the data integrity check).

The online system outputs 340 the new data integrity instructions from the generative model. For example, the online system publishes the new data integrity instructions to a data repository, such as the data store 240. The new data integrity instructions may be stored as a pull request identifying modifications to previously stored data integrity instructions relative to the stored data integrity instructions. Alternatively, the online system stores a file including the new data integrity instructions in a data repository.

In some embodiments, the online system displays the new data integrity instructions to the user requesting the new data integrity instructions via a user interface. Through the user interface, the user may modify one or more portions of the new data integrity instructions before the new data integrity instructions are stored in a data repository. In such embodiments, the online system stores the modified new data integrity instructions in the data repository, allowing the user to further configure or modify the new data integrity instructions before they are stored.

Figure 4:
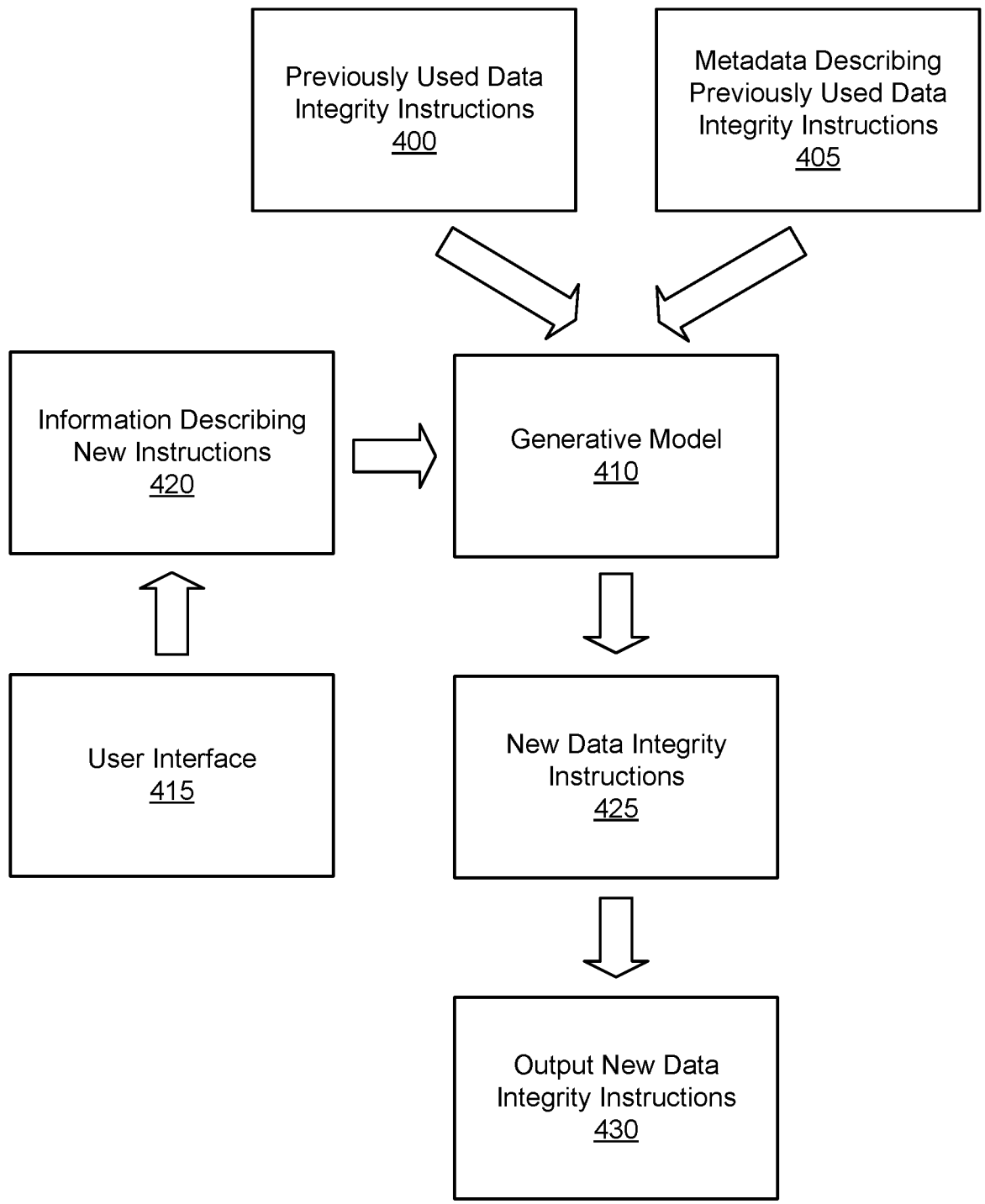
FIG. 4 is a process flow diagram of a method for generating data integrity instructions for validating data stored by an online system using a trained generative model, in accordance with one or more embodiments.

FIG. 4 is a process flow diagram of a method for generating data integrity instructions for validating data stored by an online system using a trained generative model. An online system, such as an online concierge system 140 or a data management system, maintains data from various sources. For example, different users provide the online system with data that the online system leverages to provide information to other users or to perform one or more processes. As an example, a user is a retailer providing information describing products offered by the user to the online system, and the online system leverages this information to recommend items to other users or to identify items offered by the retailer to other users.

The online system may store data in different formats or using different structures. For example, the online system stores certain data, such as data from one or more specific types of users, in databases having a first format and stores other data, such as data from one or more alternative types of users, in databases having a second format. Alternatively, the online system stores data received at different times in databases having different formats. While such flexibility in data storage formats increases an amount of data and a variety of types of data capable of being stored by the online system, maintaining data in various formats increases a complexity of the online system performing data integrity checks.

Because the online system leverages stored data to provide information to other users or to perform various processes, ensuring stored data satisfies one or more criteria prevents the online system from providing incorrect or incomplete information to users. Comparing stored data, or characteristics of stored data, to one or more criteria allows the online system to validate the stored data, with validated data suitable to be used by the online system. To reduce a likelihood of providing incorrect or incomplete information from stored data, the online system performs one or more data integrity checks. A data integrity check compares data identified by the data integrity check to one or more criteria. In response to the data satisfying at least a threshold amount of the one or more criteria, the online system determines the data is valid or otherwise suitable for use in one or more processes executed by the online system. However, in response to determining data does not satisfy at least a threshold amount of the one or more criteria, the online system determines the data is invalid or otherwise fails the data integrity check. When data is determined to be invalid, the online concierge system may notify a user from whom the data and may request the user update the data while preventing the invalid data from being included in one or more processes executed by the online system.

As the online system maintains data in various formats, different data integrity checks are applied to different data. For example, identifying data retrieved from a database with a first format uses instructions with different syntax or formatting than instructions for identifying data retrieved from another database with a second, different, format. The differing formats in which data may be stored may prevent a data integrity check from being reused for different data without review and modification to account for variations in storage format. Further, data integrity of different types of data is evaluated in different ways, so data integrity checks are conventionally manually configured by users to account for characteristics of and storage of particular data to which a data integrity check is applied. For example, certain data is valid if an aggregate value of the data satisfies a criterion, while other data is valid if each value in a specific field of the data is within a specified set of values.

To simplify generation of data integrity instructions, in one or more embodiments, the online system retrieves previously used data integrity instructions 400 stored by the online system. As used herein "data integrity instructions" refers to code for defining data validation checks or data quality checks (collectively, "data integrity checks") and code for defining dashboard interfaces in which results of a data integrity check or information from executing a data integrity check. For example, the online system maintains a repository of files, with each file including data integrity instructions that, when executed by a processor, perform a data integrity check. Each set of previously used data integrity instructions 400 includes information identifying data to be evaluated for data integrity and one or more criteria against which the identified data is evaluated. Previously used data integrity instructions 400 may include other information, such as instructions for retrieving particular data from a source (e.g., specific fields from a database), a format in which the data is stored, a time when the data integrity instructions are to be executed, determination of one or more metrics for the data that are compared to the one or more criteria, or other information describing data retrieval or determining data integrity of the retrieved data. In various embodiments, the previously used data integrity instructions 400 are retrieved from a single source, such as the online system, to account for configuration or implementation details specific to the online system.

When retrieving the previously used data integrity instructions 400, the online system also retrieves information describing modification of previously used data integrity instructions 400. For example, a file including previously used data integrity instructions 400 has an associated log file identifying modifications to the previously used data integrity instructions 400 in the file over time. Retrieving the log file along with the previously generated instructions allows the online system to account for changes to the previously generated instructions over time. As another example, the online system retrieves a pull request associated with a file including previously used data integrity instructions 400, with the pull request identifying modifications between a version of the previously used data integrity instructions 400 included in the file and a prior version of the previously used data integrity instructions 400. Further, one or more files including comments describing modification or execution of previously used data integrity instructions 400 in a file are retrieved along with the file (such comments may be included in the file including the previously used data integrity instructions 400, in some embodiments.

Additionally, the online system retrieves metadata 405 describing previously used data integrity instructions 400. The metadata 405 may describe execution of corresponding previously used data integrity instructions 400. For example, retrieved metadata 405 associated with previously used data integrity instructions 400 identifies times when the previously used data integrity instructions 400 were executed to perform a corresponding data integrity check. The online concierge system 140 may leverage stored information identifying times when the previously used data integrity instructions 400 were executed to determine a frequency with which the data integrity check corresponding to the previously used data integrity instructions 400 were executed or to determine times when the data integrity check corresponding to the previously used data integrity instructions 400 is likely to be performed. Additionally, the retrieved metadata 405 may describe a result of a data integrity check corresponding to execution of the previously used data integrity instructions 400. Further, metadata 405 may identify a format or a structure of data on which the data integrity check corresponding to the previously used data integrity instructions 400 was performed. As another example, metadata 405 for previously generated instructions 400 includes one or more parameters specified by a user for generation of the previously generated instructions 400, providing additional information about configuration of the previously generated instructions 400. For example, metadata 405 for previously generated instructions 400 includes one or more prompts received from a user that caused generation of the previously generated instructions 400. As another example, metadata 405 includes a textual description of a purpose or a goal for a data integrity check corresponding to previously used data integrity instructions 400. Different metadata 405 for different previously used data integrity instructions 400 may be retrieved in various embodiments.

In various embodiments, the metadata 405 retrieved for previously used data integrity instructions 400, or the previously used data integrity instructions 400, includes instructions for displaying a dashboard interface to a user. The dashboard interface displays instructions to a user about execution of the previously used data integrity instructions 400. For example, a dashboard interface displays one or more metrics determined by executing the previously used data integrity instructions 400 to a user. As another example, a dashboard interface presents an indication whether data is valid or is invalid in response to execution of the previously used data integrity instructions 400. Instructions may also identify a communication channel used to present a result of a data integrity check corresponding to previously used data integrity instructions 400 to a user (e.g., via an email, via a web page, a textual display, a graphical display, etc.).

The online system leverages the previously used data integrity instructions 400 and the metadata 405 describing execution of the previously used data integrity instructions 400 to tune a generative model 410 for generating new data integrity instructions. As further described above in conjunction with FIG. 3, the online system creates an index including multiple supplemental examples for the generative model 410. Each supplemental example includes previously used data integrity instructions 400 and corresponding metadata 405. In various embodiments, the index includes an embedding for each combination of previously used data integrity instructions 400 and corresponding metadata 405.

In some embodiments, as further described above in conjunction with FIG. 3, the generative model 410 is a large language model previously trained on a text corpus, with the generative model 410 comprising a set of weights determined through a backpropagation process from application to the text corpus, as further described above in conjunction with FIG. 2. Using the training dataset, the online system tunes the generative model 410 to output data integrity instructions that, when executed by a processor, perform a data integrity check based on one or more input parameters or display a dashboard interface to a user. In various embodiments, the online system tunes the generative model 410 by augmenting received metadata about new data integrity instructions input to the generative model 410 with a subset of previously used data integrity instructions 400 and corresponding metadata 405 from the index. This provides the generative model 410 with an example of previously used data integrity instructions 400 and corresponding metadata 405 that may be leveraged to generate new data integrity instructions.

In various embodiments, the online system generates an embedding for metadata about new data integrity instructions that is compared to embeddings for each supplemental example in an index. Based on measures of similarity between embedding for the metadata bout the new data integrity instructions and embeddings for supplemental examples, the online system identifies a supplemental example that is similar to the received metadata about the new data integrity instructions. For example, the online system selects a supplemental example having an embedding with a maximum measure of similarity (e.g., cosine similarity, dot product) to the embedding for the metadata about the new data integrity instructions. The online system generates a prompt for the generative model 410 by augmenting the received metadata about the new data integrity instructions with a subset of previously used data integrity instructions 400 and corresponding metadata 405 included in the selected supplemental example. In some embodiments, the prompt includes the metadata about the new data integrity instructions and the embedding of the selected supplemental example. Hence, the generative model 410 is applied to the received metadata about the new data integrity instructions combined with the subset of previously used data integrity instructions 400 and corresponding metadata 405 from the selected supplemental example, so the see supplemental example provides the generative model with additional context for generating new data integrity instructions based on the metadata about the new data integrity instructions.

In response to receiving a request from a user to generate new data integrity instructions, the online system presents a user interface 415 requesting metadata or other information about the new data integrity instructions to the user. For example, the online system presents the user interface 415 in response to receiving a request from the user to create new data integrity instructions. In response to the request from the user, the online system generates and presents a user interface 415 requesting information 420, such as metadata, describing the new data integrity instructions. For example, the information 420 identifies a source of data to be evaluated, one or more criteria for determining data integrity, or other information describing configuration or operation of a data integrity check corresponding to the new data integrity instructions. In various embodiments, the user interface 415 receives unstructured text as the information 420 describing the new data integrity instructions. In some embodiments, the user interface 415 includes multiple fields that each request different information 420 describing the new data integrity instructions from the user. Example information 420 describing the new data integrity instructions includes a database or other storage location of data, identifiers of one or more fields within the database from which data is retrieved, criteria against which data is evaluated, a type of data integrity check to be performed, information from the data integrity check to be displayed, a format in which information from the data integrity check is displayed, or other information.

The online system generates a prompt for the generative model 410 including the subset of previously used instructions 400 and corresponding metadata 405 selected based on similarity to the information 420 describing the new data integrity instructions. Based on the generated prompt, the generative model 410 outputs new data integrity instructions 425 that, when executed by a processor, retrieve data based on the information 420 describing the new data integrity instructions and determine whether the retrieved data satisfies at least a threshold amount of criteria for a data quality check. As the generative model 410 leverages the subset of previously generated instructions 400 and corresponding metadata 405 included in the prompt, the generative model 410 automatically determines syntax and configuration of the new data integrity instructions, reducing an amount of time for creation and subsequent execution of the new data integrity instructions 425.

In various embodiments, the new data integrity instructions 425 output by the generative model 410 also describe generation and display of a dashboard interface including information from performance of a data integrity check corresponding to the new data integrity instructions 425. For example, the new data integrity instructions include instructions describing a format for presentation of a determination whether data is valid or is invalid. So the new data integrity instructions 425 may determine how information describing performance of a data integrity check is displayed to a user in various embodiments.

The online system outputs 430 the new data integrity instructions by storing the new data integrity instructions 425 to a data repository. For example, the online system publishes the new data integrity to a data store 240 for subsequent retrieval. In various embodiments, the online system stores the generated prompt used to generate the new data integrity instructions 425 in association with the new data integrity instructions 425. Further, in some embodiments, the online system displays the new data integrity instructions 425 to the user requesting the new data integrity instructions via a user interface, allowing the user to review and to modify one or more portions of the new data integrity instructions 425. The online system stores the new data integrity instructions 425 after modification by the user, allowing the user to modify the output from the generative model 410.

The online system may subsequently execute the new data integrity instructions 425 to perform the data integrity check corresponding to the new data integrity instructions 425. In various embodiments, the new data integrity instructions 425 include instructions for generating and for displaying information about executing the new data integrity instructions 425. For example, the new data integrity instructions 425 include display instructions that, when executed by a processor, generate a dashboard interface displaying information describing execution of the new data integrity instructions 425, such as an indication whether performance of the data integrity check corresponding to the new data integrity instructions 425 indicated data was valid or was invalid, one or more metrics generated from performance of the data integrity check, or other information describing performance of the data integrity check. Hence, the generative model 410 simplifies generation of new data integrity instructions 425 by leveraging previously used data integrity instructions 400 and corresponding metadata 400. This reduces an amount of time and user input for creating new data integrity instructions 425, while increasing a likelihood that the new data integrity instructions 425 conform to syntax and configuration information for the stored data being validated.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:
    accessing a data repository that stores:
        historical data integrity instructions previously used by a data management system, wherein the historical data integrity instructions comprise code that defines historical data integrity checks,
        metadata about the historical data integrity instructions, wherein the metadata includes one or more parameters specified by a user for generation of the historical data integrity instructions, and
        a log file including a plurality of pull requests, wherein each pull request identifies modifications between a version of the historical data integrity instructions and a prior version of the historical data integrity instructions;
    receiving, via a user interface, a request to generate:
        new data integrity instructions for a set of data maintained by the data management system, wherein the request includes parameters for the new data integrity instructions;
    comparing a supplemental example to the parameters for the new data integrity instructions, wherein the supplemental example identifies historical data integrity instructions;
    selecting the supplemental example based on the comparing of the supplemental example to the parameters for the new data integrity instructions;
    accessing pull requests and corresponding metadata of the identified historical data integrity instructions;
    tuning a large language model on the identified historical data integrity instructions, accessed pull requests, and accessed corresponding metadata, wherein the tuning configures the large language model to output data integrity instructions tailored for data identified in an input to the large language model based on the identified historical data integrity instructions, accessed pull requests, and accessed corresponding metadata, wherein the outputted data integrity instructions, when executed by a processor, cause the processor to perform a data integrity check of the data identified in the input;
    generating a prompt to generate the new data integrity instructions for the set of data;
    applying the large language model to the generated prompt to a large language model
    receiving, from the large language model in response to providing the prompt thereto, the requested new data integrity instructions; and
    performing a data integrity check by executing the requested new data integrity instructions; and
    in response to performing the data integrity check, presenting, at the user interface, an indication of data validity or invalidity.

2. The method of claim 1, wherein storing the historical data integrity instructions comprises storing instructions to perform a data integrity check that determines whether stored data maintained by the data management system is valid.

3. The method of claim 1, wherein the data repository further stores instructions that, when executed by a processor, generate a dashboard interface displaying information describing performance of a data integrity check on stored data maintained by the data management system.

4. The method of claim 1, wherein receiving the request includes a request to generate a textual description of a purpose of the new data integrity instructions.

5. The method of claim 1, further comprising:
    displaying, via an interface, the new data integrity instructions to a user from whom the request was received.

6. The method of claim 5, wherein outputting the data integrity instructions in response to the user request comprises:
    receiving one or more modifications to the new data integrity instructions from the user;
    modifying the new data integrity instructions based on the one or more modifications; and
    storing the modified new data integrity instructions to the data repository.

7. The method of claim 1, further comprising:
    determining an embedding for parameters of the requested new data integrity instructions;
    determining an embedding for the supplemental example, wherein the embedding of the supplemental example represents the identified historical data integrity instructions in high dimensional space; and
    wherein comparing a supplemental example to the parameters for the new data integrity instructions comprises determining a measure of similarity between an embedding of a supplemental example and an embedding of the parameters for the new data integrity instructions.

8. A computer program product comprising a non-transitory computer readable storage medium having instructions encoded thereon that, when executed by a processor, cause the processor to perform steps comprising:
    accessing a data repository that stores:
        historical data integrity instructions previously used by a data management system, wherein the historical data integrity instructions comprise code that defines historical data integrity checks,
        metadata about the historical data integrity instructions, wherein the metadata includes one or more parameters specified by a user for generation of the historical data integrity instructions, and
        a log file including a plurality of pull requests, wherein each pull request identifies modifications between a version of the historical data integrity instructions and a prior version of the historical data integrity instructions;

receiving, via a user interface, a request to generate:
  new data integrity instructions for a set of data maintained by the data management system, wherein the request includes parameters for the new data integrity instructions;
comparing a supplemental example to the parameters for the new data integrity instructions, wherein the supplemental example identifies historical data integrity instructions;
selecting the supplemental example based on the comparing of the supplemental example to the parameters for the new data integrity instructions;
accessing pull requests and corresponding metadata of the identified historical data integrity instructions;
tuning a large language model on the identified historical data integrity instructions, accessed pull requests, and accessed corresponding metadata, wherein the tuning configures the large language model to output data integrity instructions tailored for data identified in an input to the large language model based on the identified historical data integrity instructions, accessed pull requests, and accessed corresponding metadata, wherein the outputted data integrity instructions, when executed by a processor, cause the processor to perform a data integrity check of the data identified in the input;
generating a prompt to generate the new data integrity instructions for the set of data;
applying the large language model to the generated prompt to a large language model;
receiving, from the large language model in response to providing the prompt thereto, the requested new data integrity instructions; and
performing a data integrity check by executing the requested new data integrity instructions; and
in response to performing the data integrity check, presenting, at the user interface, an indication of data validity or invalidity.

9. The computer program product of claim 8, wherein storing the historical data integrity instructions comprises storing instructions that, when executed by a processor, generate a dashboard interface displaying information describing performance of a data integrity check on stored data maintained by the data management system.

10. The computer program product of claim 8, wherein receiving the request includes a request to generate a textual description of a purpose of the new data integrity instructions.

11. The computer program product of claim 8, the steps further comprising:
displaying, via an interface, the new data integrity instructions to a user from whom the request was received.

12. The computer program product of claim 11, wherein outputting the data integrity instructions in response to the user request comprises:
receiving one or more modifications to the new data integrity instructions from the user;
modifying the new data integrity instructions based on the one or more modifications; and
storing the modified new data integrity instructions to the data repository.

13. The computer program product of claim 11, the steps further comprising:
determining an embedding for parameters of the requested new data integrity instructions;
determining an embedding for the supplemental example, wherein the embedding of the supplemental example represents the identified historical data integrity instructions in high dimensional space; and
wherein comparing a supplemental example to the parameters for the new data integrity instructions comprises determining a measure of similarity between an embedding of a supplemental example and an embedding of the parameters for the new data integrity instructions.

14. A system comprising:
a processor; and
a non-transitory computer readable storage medium having instructions encoded thereon that, when executed by the processor, cause the processor to perform steps including:
  accessing a data repository that stores:
    historical data integrity instructions previously used by a data management system, wherein the historical data integrity instructions comprise code that defines historical data integrity checks,
    metadata about the historical data integrity instructions, wherein the metadata includes one or more parameters specified by a user for generation of the historical data integrity instructions, and
    a log file including a plurality of pull requests, wherein each pull request identifies modifications between a version of the historical data integrity instructions and a prior version of the historical data integrity instructions;
  receiving, via a user interface, a request to generate:
    new data integrity instructions for a set of data maintained by the data management system, wherein the request includes parameters for the new data integrity instructions;
  comparing a supplemental example to the parameters for the new data integrity instructions, wherein the supplemental example identifies historical data integrity instructions;
  selecting the supplemental example based on the comparing of the supplemental example to the parameters for the new data integrity instructions;
  accessing pull requests and corresponding metadata of the identified historical data integrity instructions;
  tuning a large language model on the identified historical data integrity instructions, accessed pull requests, and accessed corresponding metadata, wherein the tuning configures the large language model to output data integrity instructions tailored for data identified in an input to the large language model based on the identified historical data integrity instructions, accessed pull requests, and accessed corresponding metadata, wherein the outputted data integrity instructions, when executed by a processor, cause the processor to perform a data integrity check of the data identified in the input;
  generating a prompt to generate the new data integrity instructions for the set of data;
  applying the large language model to the generated prompt to a large language model;
  receiving, from the large language model in response to providing the prompt thereto, the requested new data integrity instructions; and
  performing a data integrity check by executing the requested new data integrity instructions; and
  in response to performing the data integrity check, presenting, at the user interface, an indication of data validity or invalidity.

15. The method of claim 1, wherein tuning the large language model comprises:

including, in the generated prompt, the identified historical data integrity instructions, accessed pull requests, and accessed corresponding metadata.

16. The computer program product of claim 8, wherein tuning the large language model comprises:
including, in the generated prompt, the identified historical data integrity instructions, accessed pull requests, and accessed corresponding metadata.

17. The system of claim 14, wherein tuning the large language model comprises:
including, in the generated prompt, the identified historical data integrity instructions, accessed pull requests, and accessed corresponding metadata.

* * * * *